US012809527B2

(12) United States Patent
Kim et al.

(10) Patent No.: US 12,809,527 B2
(45) Date of Patent: Nov. 24, 2026

(54) MEMORY DEVICE AND REFRESH METHOD THEREOF

(71) Applicant: SAMSUNG ELECTRONICS CO., LTD., Suwon-si (KR)

(72) Inventors: Sang-Yun Kim, Suwon-si (KR); Kyu-Chang Kang, Suwon-si (KR); In Cheol Nam, Suwon-si (KR); Hyun-Chul Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 19/004,578

(22) Filed: Dec. 30, 2024

(65) Prior Publication Data

US 2026/0016965 A1 Jan. 15, 2026

(30) Foreign Application Priority Data

Jul. 10, 2024 (KR) ........................ 10-2024-0091160

(51) Int. Cl.
*G06F 3/06* (2006.01)

(52) U.S. Cl.
CPC .......... *G06F 3/0616* (2013.01); *G06F 3/0653* (2013.01); *G06F 3/0659* (2013.01); *G06F 3/0673* (2013.01)

(58) Field of Classification Search
CPC .... G06F 3/0616; G06F 3/0653; G06F 3/0659; G06F 3/0673; G11C 11/40611; G11C 8/14; G11C 11/4087; G11C 11/4091
See application file for complete search history.

(56) References Cited

U.S. PATENT DOCUMENTS

| | | | |
|---|---|---|---|
| 5,822,264 A | 10/1998 | Tomishima et al. | |
| 7,251,179 B2 | 7/2007 | Ohsawa | |
| 7,430,041 B2 | 9/2008 | Ohsawa | |
| 7,440,329 B2 | 10/2008 | Ohsawa | |
| 7,440,353 B2 | 10/2008 | Kim et al. | |
| 7,596,038 B2 | 9/2009 | Kim et al. | |
| 7,872,933 B2 | 1/2011 | Ohsawa | |
| 8,085,572 B2 | 12/2011 | Lee et al. | |
| 8,223,574 B2 | 7/2012 | Nautiyal et al. | |
| 8,797,819 B2 | 8/2014 | Carman et al. | |
| 2006/0044911 A1 | 3/2006 | Ohsawa | |
| 2007/0177443 A1 | 8/2007 | Ohsawa | |
| 2007/0258294 A1 | 11/2007 | Ohsawa | |
| 2008/0084774 A1 | 4/2008 | Kim et al. | |
| 2008/0316849 A1 | 12/2008 | Ohsawa | |
| 2009/0116318 A1* | 5/2009 | Kuroda | G11C 7/14 365/210.1 |

(Continued)

*Primary Examiner* — Xiaochun L Chen
(74) *Attorney, Agent, or Firm* — MORGAN, LEWIS & BOCKIUS LLP

(57) ABSTRACT

A memory device including: a memory cell array including a plurality of sub-array blocks, wherein the plurality of sub-array blocks include a plurality of word lines and a plurality of bit lines; a command decoder configured to decode a command received from a memory controller and generate a refresh command to control a refresh operation; and a refresh control circuit configured to receive the refresh command from the command decoder, determine a target row address corresponding to a sub-array block based on a number of body refreshes performed on the sub-array blocks, and output the target row address.

20 Claims, 14 Drawing Sheets

(56) References Cited

U.S. PATENT DOCUMENTS

| | | | |
|---|---|---|---|
| 2009/0296453 A1 | 12/2009 | Lee et al. | |
| 2010/0110816 A1 | 5/2010 | Nautiyal et al. | |
| 2013/0250674 A1 | 9/2013 | Carman et al. | |
| 2022/0223217 A1 * | 7/2022 | Na | G11C 16/16 |

* cited by examiner

200

400

MEMORY DEVICE AND REFRESH METHOD THEREOF

CROSS-REFERENCE TO RELATED APPLICATION

This application claims priority under 35 U.S.C. § 119 to Korean Patent Application No. 10-2024-0091160, filed in the Korean Intellectual Property Office on Jul. 10, 2024, the disclosure of which is incorporated by reference herein in its entirety.

(a) TECHNICAL FIELD

The present disclosure relates to a memory device and a refresh method therefor.

(b) DISCUSSION OF RELATED ART

A volatile memory device, such as dynamic random access memory (DRAM), stores data by maintaining a charge in the capacitive load of a memory cell, and reads data by detecting the stored charge. However, the charge in the capacitive load gradually leaks over time, requiring the memory device to periodically perform a refresh operation.

SUMMARY

An embodiment of the present disclosure provides a memory device and a refresh method therefor, designed to reduce leakage current.

An embodiment of the present disclosure provides a memory device including: a memory cell array including a plurality of sub-array blocks, wherein the plurality of sub-array blocks include a plurality of word lines and a plurality of bit lines; a command decoder configured to decode a command received from a memory controller and generate a refresh command to control a refresh operation; and a refresh control circuit configured to receive the refresh command from the command decoder, determine a target row address corresponding to a sub-array block based on a number of body refreshes performed on the sub-array blocks, and output the target row address.

An embodiment of the present disclosure provides a memory device including: a memory cell region including a plurality of memory cells connected to a plurality of word lines and a plurality of bit lines; and a peripheral circuit region stacked with respect to the memory cell region, the peripheral circuit region including a plurality of bit line sense amplifiers configured to detect and amplify signal differences between the bit lines, a plurality of dummy memory cells, and a plurality of switching transistors configured to connect the bit lines to the dummy memory cells.

An embodiment of the present disclosure provides a refresh method for a memory device including: receiving a refresh command to control the execution of a refresh operation; outputting a normal refresh command or a body refresh command based on the refresh command; outputting a row address to perform a normal refresh operation in response to the normal refresh command, and determining a target row address for a sub-array block among a plurality of sub-array blocks to perform a body refresh operation in response to the body refresh command; and outputting the target row address or the row address.

DETAILED DESCRIPTION OF THE EMBODIMENTS

Figure 1:
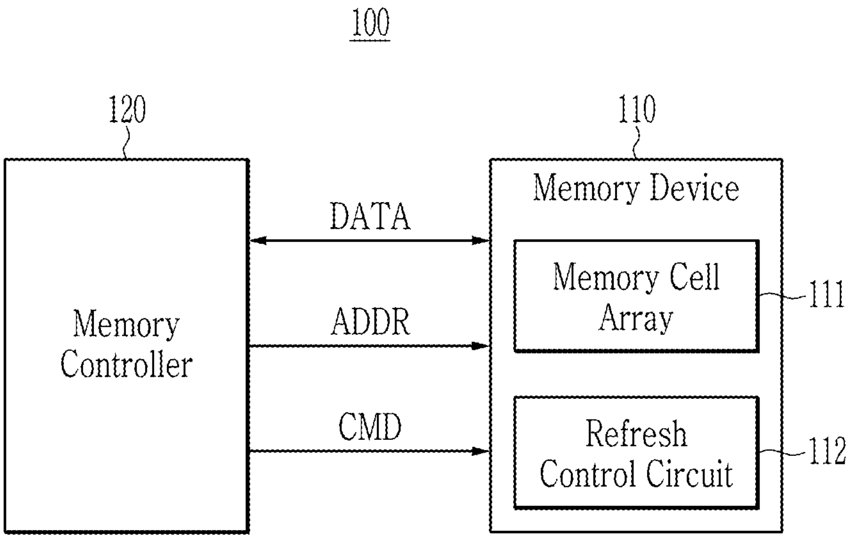
FIG. 1 illustrates a block diagram of a memory system according to an embodiment.

The following detailed description illustrates certain embodiments of the present disclosure by way of example. However, as those skilled in the art would realize, these embodiments may be modified in various ways, without departing from the spirit or scope of the present disclosure.

Accordingly, the drawings and description are to be regarded as illustrative in nature and not restrictive. Like reference numerals are used to designate like elements throughout the specification. In the flowchart described with reference to the drawings, the order of operations may be rearranged, certain operations may be combined or divided, specific operations may be omitted.

In addition, expressions written in the singular may be interpreted as singular or plural unless explicitly stated otherwise, such as terms like "one" or "single.". Ordinal terms such as "first," "second," and the like are used solely to describe various components and should not be construed as limiting. These terms are intended to distinguish one component from another.

The present disclosure will now be described in greater detail through examples. These examples are provided solely for illustrative purposes and do not limit the scope of the present disclosure.

The present disclosure provides an efficient method to address leakage currents in memory cell arrays, particularly in vertical channel transistors (VCT) and gate-all-around (GAA) transistors, where the lack of body contacts leads to charge accumulation in the body region. By designating a dummy cell region within the memory cell array, the present disclosure performs a body refresh operation, writing data "0" to the dummy cells and grounding the connected bit lines. This transfers accumulated holes from the body region to the bit lines, reducing charge leakage and improving memory performance.

Additionally, the present disclosure incorporates a temperature-based mechanism to adjust the frequency of body refresh operations. At higher temperatures, where leakage is more pronounced, the ratio of body refresh to normal refresh operations is increased, ensuring effective charge management under varying conditions. This method offers a simpler and more effective alternative to prior art approaches, which are often complex and impact memory performance.

FIG. 1 illustrates a block diagram of a memory system according to an embodiment.

Referring to FIG. 1, the memory system 100 may include a memory device 110 and a memory controller 120. In some embodiments, the memory device 110 and the memory controller 120 may be connected through a memory interface to transmit and receive signals.

The memory device 110 may include a memory cell array 111 and a refresh control circuit 112. The memory array 111 may include a plurality of sub-array blocks. Each of the sub-array blocks may include a plurality of memory cells defined by a plurality of rows and a plurality of columns. In some embodiments, rows may be defined by wordlines and columns may be defined by bitlines. The refresh control circuit 112 may determine an address of a row to be body refreshed among the rows, and may output a target row address. In other words, the refresh control circuit 112 may identify a row to undergo a body refresh among the rows and output the corresponding target row address. In some embodiments, the target row may be a first row or a last row among the rows.

The memory controller 120 controls a memory operation of the memory device 110 by providing a signal to the memory device 110. The signal may include a command CMD and an address ADDR. In some embodiments, the memory controller 120 may provide the command CMD and the address ADDR to the memory device 110 to access the memory cell array 111 and control a memory operation such as reading or writing. According to the reading operation, data DATA is transferred from the memory cell array 111 to the memory controller 120, and according to a writing operation, the data DATA may be transferred from the memory controller 120 to the memory cell array 111.

The command CMD may include an activation command, a reading/writing command, and a refresh command. In some embodiments, the command CMD may further include a precharge command. The activation command may activate the target row of the memory cell array 111 to enable data writing or reading operations. The reading/writing command may initiate a read or write operation in a target memory cell of the activated row, while the refresh command may trigger a refresh operation in the memory cell array 111.

In some embodiments, the refresh control circuit 112 may output a normal refresh command or a body refresh command in response to the refresh command. The body refresh command may initiate a refresh operation targeting the body of a sub-array block containing the target row. For example, the body refresh command may lower the voltage applied to a bit line, enabling the transfer of accumulated holes from the body to the bit line.

The normal refresh command may initiate a normal refresh operation, such as sequentially refreshing the rows of the memory cell array 111. Normal refresh may include auto-refresh that is performed when the memory device 200 is in use and self-refresh that is performed when the memory device 200 is in an idle state.

In some embodiments, memory controller 120 may access the memory device 110 upon request from a host external to the memory system 100. The memory controller 120 may communicate with the host by using various protocols.

The memory device 110 may be a storage device based on a semiconductor device. In some embodiments, the memory device 110 may include a dynamic random access memory (DRAM) device. In some embodiments, the memory device 110 may include another memory device in which the refresh operation is used.

Figure 2:
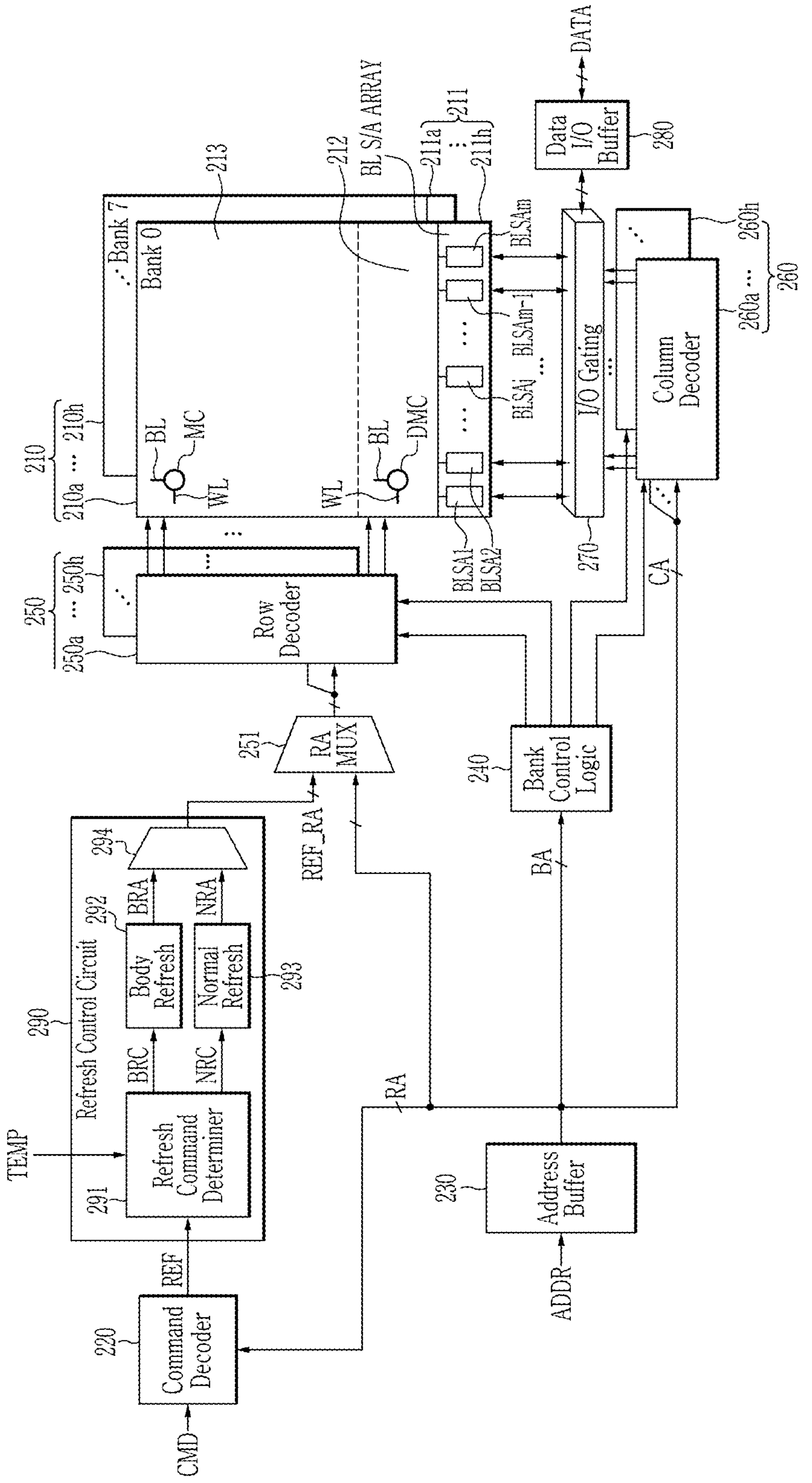
FIG. 2 illustrates a block diagram showing a memory device according to an embodiment.

FIG. 2 illustrates a block diagram showing a memory device according to an embodiment.

Referring to FIG. 2, the memory device 200 may include a memory cell array 210, a sense amplifier 211, a command decoder 220, an address buffer 230, a bank control circuit (or bank control logic) 240, a row decoder 250, a column decoder 260, an input/output (I/O) gating circuit 270, a data I/O buffer 280, and a refresh control circuit 290.

The memory cell array 210 may include a plurality of memory cells MC. In some embodiments, the memory cell array 210 may include a plurality of memory banks 210*a* to 210*h*. Although eight memory banks (BANK0 to BANK7) 210*a* to 210*h* are shown in FIG. 2, a number of memory banks is not limited thereto. Each of the memory banks 210*a* to 210*h* may include a plurality of rows, a plurality of columns, and a plurality of memory cells MC arranged at intersections of the rows and the columns. In some embodiments, the rows may be defined by a plurality of word lines WL, and the columns may be defined by a plurality of bit lines BL.

The memory cell array 210 may include a dummy cell array region 212 and a normal cell array region 213. The dummy cell array region 212 may include a plurality of dummy memory cells DMC positioned in the first or last row of the memory cell array 210. The normal cell array region 213 may include an area of the memory cell array 210 excluding the dummy cell array region 212.

For example, the dummy cell array region 212 may include dummy memory cells DMC allocated in the lower row of the normal cell array region 213, along the columns of the memory device 200, and at the intersections between the lower row of the normal cell array area 213 and the columns of the memory device 200. In this case, the dummy cell array region 212 may be a region subject to a body refresh.

The memory cells MC included in the normal cell array region 213 may receive electrical interference from adjacent memory cells MC because the adjacent memory cells MC store different data. Data may not be stored in the dummy memory cells DMC included in the dummy cell array region 212. This is because charge may flow from the dummy memory cells DMC to the bit line BL during the body refresh process.

Body refresh may apply a ground voltage to the bit line BL to prevent current leakage from the dummy memory cells DMC to the bit line BL, to transfer holes accumulated in the body region of the dummy memory cells DMC to the bit line BL. In this way, the body refresh operation ensures that the dummy memory cells DMC remain electrically stable and do not disrupt the function of the active memory cells MC. By controlling charge accumulation and leakage, the operation contributes to the reliable performance of the memory device 200.

The command decoder 220 may generate a control signal to enable the memory device 200 to perform a read operation, a write operation, or a refresh operation. The command decoder 220 may generate a refresh command REF by decoding the command CMD received from the memory controller 120 (e.g., in FIG. 1).

The address buffer 230 receive the address ADDR provided from the memory controller 120. The address ADDR may include a row address RA indicating a row of the memory cell array 210, a column address CA indicating a column thereof, and a bank address BA indicating a memory bank. The row address RA is provided to the row decoder 250, and the column address CA is provided to the column decoder 260. The row address RA may be provided to the refresh control circuit 290 through the command decoder 220 or may be provided directly to the refresh control circuit 290.

In some embodiments, the memory device 200 may further include a row address multiplexer 251. The row address multiplexer 251 may receive the row address RA from the address buffer 230 and a row address REF_RA to be refreshed from the refresh control circuit 290. The row address multiplexer 251 may selectively output the row address RA received from the address buffer 230 and the row address REF_RA received from the refresh control circuit 290 to the row decoder 250.

The row decoder 250 may select a row to be activated among the rows of the memory cell array 210 based on the row address RA or REF_RA. To achieve this, the row decoder 250 may apply a driving voltage to a word line corresponding to the row to be activated. In some embodiments, the row decoders 250*a* to 250*h* may be provided for the respective memory banks 210*a* to 210*h*.

The column decoder 260 may select a column to be activated from among the columns of the memory cell array 210 based on the column address CA. To achieve this, the column decoder 260 may activate the sense amplifier 211 corresponding to the column address CA through the I/O gating circuit 270. In some embodiments, the column decoders 260*a* to 260*h* respectively corresponding to the memory banks 210*a* to 210*h* may select a column to be activated among the columns of the memory cell array 210 based on each column address CA. The column decoders 260*a* to 260*h* may activate the sense amplifier 211 corresponding to the column address CA through the I/O gating circuit 270.

The I/O gating circuit 270 may gate input/output data DATA, and may include a data latch for storing data read from the memory cell array 210 and a writing driver for writing data to the memory cell array 210. Data read from the memory cell array 210 may be sensed by the sense amplifier 211, and may be stored in the I/O gating circuit 270 (e.g., a data latch).

The sense amplifier 211 may be connected to the bit lines BL of the memory cell array 110. The sense amplifier 211 may include a plurality of bit line sense amplifiers BLSA1, BLSA2, . . . , BLSAj, . . . , BLSAm−1, and BLSAm connected to each bit line BL. The sense amplifier 211 may detect voltage changes in the corresponding bit lines BL, may amplify them, and may output them. Data of the bit line BL to be sensed and amplified by the sense amplifier 211 may be selected through the I/O gating circuit 270.

In some embodiments, during the body refresh process, the sense amplifier 211 may detect voltage changes in the bit lines BL connected to the dummy memory cells DMC, and amplify and output the data "0" stored in the dummy memory cells DMC. Data of the bit line BL to be sensed and amplified by the sense amplifier 211 may be selected through the I/O gating circuit 270.

In some embodiments, the sense amplifier 211 may apply a ground voltage to the bit lines BL connected to the dummy memory cells DMC in response to a body refresh command BRC outputted from the refresh control circuit 290. As a result, holes accumulated in the body region of the dummy memory cells DMC may be transferred to the bit lines BL.

In some embodiments, a plurality of bit line sense amplifiers 211*a* to 211*h* corresponding to the respective memory banks 210*a* to 210*h* may be provided. Data read from the memory banks 210*a* to 210*h* may be sensed by the bit line sense amplifiers 211*a* to 211*h* corresponding to the memory banks 210*a* to 210*h*, and may be stored in the I/O gating circuit 270 (e.g., data latch).

In some embodiments, the memory device 200 may further include the bank control logic 240 that generates a bank control signal in response to the bank address BA. In response to the bank control signal, the row decoder 250 corresponding to the bank address BA among the row decoders 250*a* to 250*h* may be activated, and among the column decoders 260*a* to 260*h*, the column decoder 260 corresponding to the bank address BA may be activated.

In some embodiments, data read from the memory cell array 210 (e.g., data stored in a data latch) may be provided to the memory controller 120 through the data I/O buffer 280. Data to be written into the memory cell array 210 may be provided from the memory controller 120 to the data I/O buffer 280, and data provided to the data I/O buffer 280 may be provided to the I/O gating circuit 270.

The refresh control circuit 290 may output a normal refresh command NRC or the body refresh command BRC in response to the refresh command REF. The refresh control circuit 290 may transfer the row address REF_RA to be refreshed to the row decoder 250 based on the normal refresh command NRC or the body refresh command BRC.

The refresh control circuit 290 may transfer a row address NRA as the row address REF_RA to be refreshed to the row decoder 250 based on the normal refresh command NRC. The refresh control circuit 290 may transfer a target row address BRA as the row address REF_RA to be refreshed REF_RA to the row decoder 250 based on the body refresh command BRC.

In some embodiments, the refresh control circuit 290 may output the normal refresh command NRC or the body refresh command BRC based on a temperature TEMP (also referred to as temperature data). Specifically, the refresh control circuit 290 may transfer the target row address BRA or the row address NRA as the row address REF_RA to be refreshed to the row decoder 250 based on the temperature TEMP. For example, at a first temperature, the refresh control circuit 290 may output the target row address BRA and the row address NRA as the row address REF_RA to be refreshed at a ratio of 1:a, where a is a positive integer. At a second temperature, which is higher than the first temperature, the reference control circuit 290 may output the target row address BRA and the row address NRA as the row address REF_RA to be refreshed at a ratio of 1:b, where b is a positive integer with $b<a$. The temperature TEMP may be measured by a temperature measurement sensor positioned within the memory device 200 to be outputted to the refresh control circuit 290.

In some embodiments, the refresh control circuit 290 may include a refresh command determiner 291, a body refresh control circuit 292, a normal refresh control circuit 293, and a refresh row address selector 294.

The refresh command determiner 291 may receive the refresh command REF from the command decoder 220, and may output the normal refresh command NRC or the body refresh command BRC in response to the refresh command REF. In this case, the refresh instruction determiner 291 may output a normal refresh command NRC or the body refresh command BRC using temperature data TEMP obtained from a temperature measurement sensor.

The body refresh control circuit 292 may determine the target row address BRA for performing body refresh among the rows, and may output the target row address BRA in response to the body refresh command BRC. In some embodiments, the target row address BRA may be a row address corresponding to a word line to which a dummy memory cell is connected.

The normal refresh control circuit 293 may determine the row address NRA for performing a normal refresh operation, and may output the row address NRA in response to the normal refresh command NRC. The refresh row address selector 294 may selectively output the target row address BRA from the body refresh control circuit 292 or the row address NRA from the normal refresh control circuit 293.

In some embodiments, the refresh row address selector 294 may output the target row address BRA from the body refresh control circuit 292 as the row address REF_RA to be refreshed in response to the body refresh command BRC, and may output the row address NRA from the normal refresh control circuit 293 as the row address REF_RA to be refreshed in response to the normal refresh command NRC.

Figure 3:
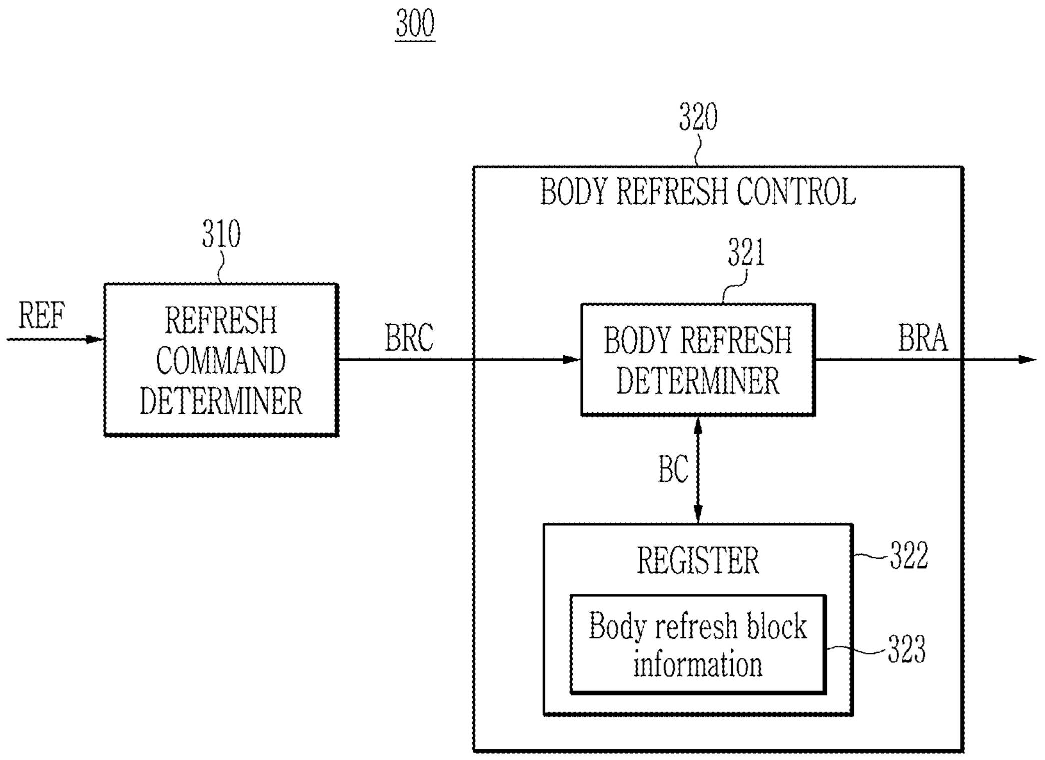
FIG. 3 illustrates a block diagram showing a portion of a refresh control circuit according to an embodiment.

FIG. 3 illustrates a block diagram showing a portion of a refresh control circuit according to an embodiment.

Referring to FIG. 3, the refresh control circuit 300 according to an embodiment may include a refresh command determiner 310 and a body refresh control circuit 320.

The refresh command determiner 310 may receive the refresh command REF from the memory controller 120 (in FIG. 1). The refresh command determiner 310 may receive the temperature data TEMP (see FIG. 2). The refresh command determiner 310 may output a body refresh command BRC or a normal refresh command NRC in response to the refresh command REF based on the temperature data TEMP.

The body refresh control circuit 320 may receive the body refresh command BRC from the refresh command determiner 310, and may output the target row address BRA in response to the body refresh command BRC. The body refresh control circuit 320 may include a body refresh determiner 321 and a register 322.

The register 322 may include body refresh block information 323. The body refresh block information 323 may include a plurality of target row addresses BRA and a plurality of body refresh counts BC corresponding to a plurality of sub-array blocks. As can be seen, the body refresh block information 323 stores data used to manage body refresh operations across multiple sub-array blocks in a memory device 110 (in FIG. 1). The body refresh block information 323 includes target row addresses BRA, which specify the rows to be refreshed, and body refresh counts BC, which track how often the refresh has been performed for those rows. This ensures efficient maintenance of memory stability and performance across different sections of the memory device 110 (in FIG. 1). The register 322 has been described as a component within the body refresh control circuit 320, but the present disclosure is not limited thereto, and the register 322 may be a separate memory within the memory device 110 (in FIG. 1).

The body refresh determiner 321 may read the body refresh block information 323 from the register 322 in response to the body refresh command BRC received from the refresh command determiner 310. The body refresh determiner 321 may obtain the body refresh counts BC for each of the sub-array blocks based on the body refresh block information 323.

The body refresh determiner 321 may output the target row address BRA based on the body refresh block information 323. For example, the body refresh determiner 321 may determine a target sub-array block with the lowest body refresh counts BC among the sub-array blocks, and output its corresponding row address as the target row address BRA.

The body refresh determiner 320 may transfer the target row address BRA to the row decoder 250 (in FIG. 2) through the row address multiplexer 251 (in FIG. 2).

Figure 4:
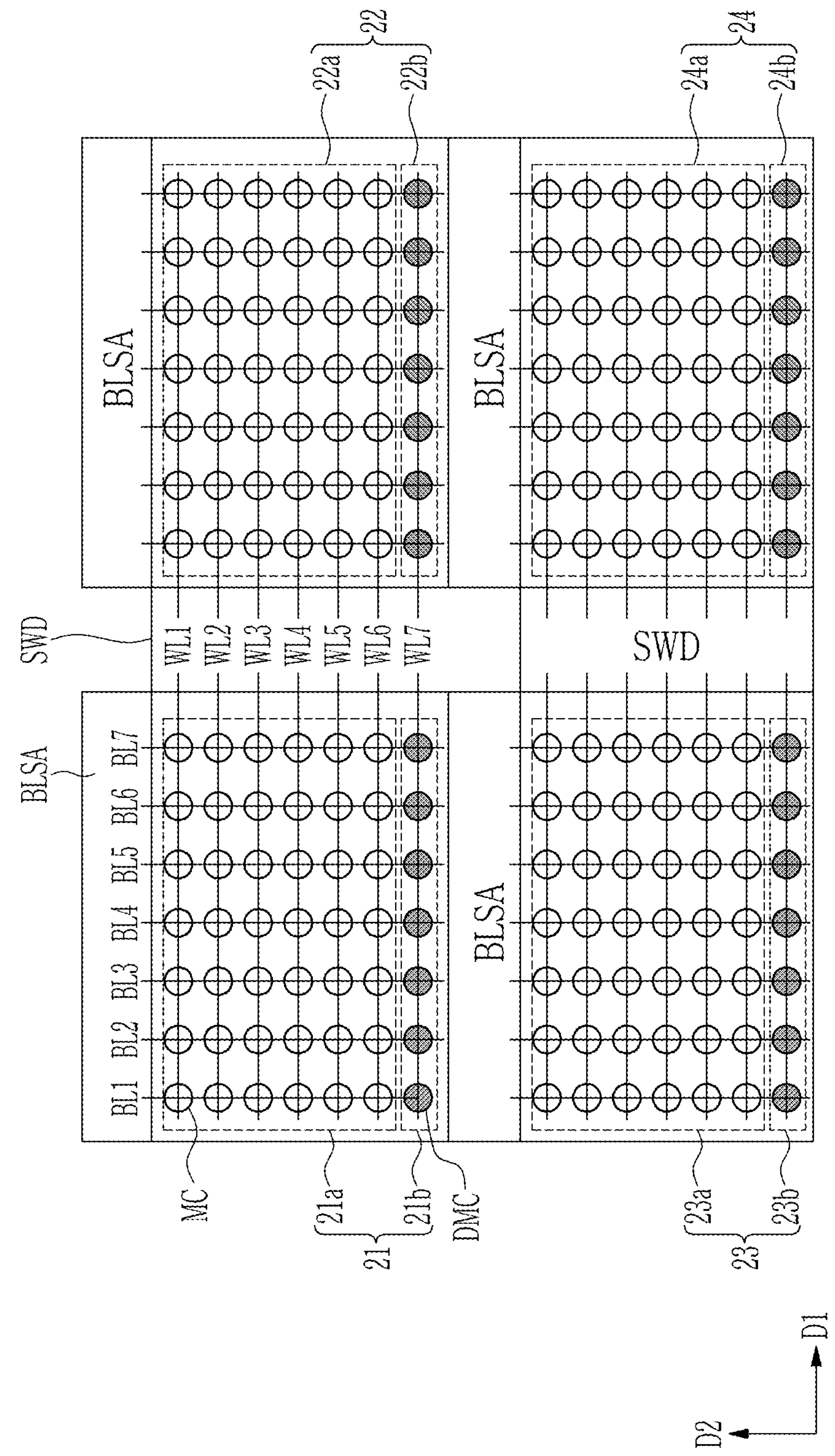
FIG. 4 illustrates a memory cell array according to an embodiment.

FIG. 4 illustrates a memory cell array according to an embodiment.

Referring to FIG. 4, a memory cell array 400 may include a plurality of sub-array blocks 21, 22, 23, and 24. The sub-array blocks 21, 22, 23, and 24 may each include a plurality of bit lines BL1, BL2, BL3, BL4, BL5, BL6, and BL7, a plurality of word lines WL1, WL2, WL3, WL4, WL5, WL6, and WL7, and a plurality of memory cells MC and a plurality of dummy memory cells DMC connected to the bit lines BL1, BL2, BL3, BL4, BL5, BL6, and BL7 and the word lines WL1, WL2, WL3, WL4, WL5, WL6, and WL7.

The sub-array blocks 21, 22, 23, and 24 may include normal cell array regions 21*a*, 22*a*, 23*a*, and 24*a* and dummy cell array regions 21*b*, 22*b*, 23*b*, and 24*b*, respectively. The dummy cell array regions 21*b*, 22*b*, 23*b*, and 24*b* may include a plurality of dummy memory cells DMC positioned in a first or last row of each of the sub-array blocks 21, 22, 23, and 24. The normal cell array regions 21*a*, 22*a*, 23*a*, and 24*a* refer to regions other than the dummy cell array regions 21*b*, 22*b*, 23*b*, and 24*b* from the sub-array blocks 21, 22, 23, and 24. The dummy cell array regions 21*b*, 22*b*, 23*b*, and 24*b* may be regions subject to a body refresh.

A sub-word line driver region SWB may be positioned between the sub-array blocks 21, 22, 23, and 24 arranged in a first direction D1. In the sub-word line driver region SWB, sub-word line drivers may be positioned. The sub-word line driver may activate a specific word line among a plurality of word lines WL1, WL2, WL3, WL4, WL5, WL6, and WL7.

A bit line sense amplifier region BLSA may be positioned between the sub-array blocks 21, 22, 23, and 24 arranged in a second direction D2. A plurality of bit line sense amplifiers may be positioned in the bit line sense amplifier region BLSA. The bit line sense amplifiers may determine a state of a memory cell MC by detecting a slight voltage difference between a plurality of bit lines BL1, BL2, BL3, BL4, BL5, BL6, and BL7.

In some embodiments, the bit line sense amplifiers may apply a ground voltage to the bit lines BL1, BL2, BL3, BL4, BL5, BL6, and BL7 in response to the body refresh command outputted from the command decoder 220 (in FIG. 2).

In some embodiments, during the body refresh process, the bit line sense amplifier 211 (in FIG. 2) may detect voltage changes in the bit lines BL1, BL2, BL3, BL4, BL5, BL6, and BL7 connected to the dummy memory cells DMC, and amplify and output the data "0" stored in the dummy memory cells DMC. Data of the bit line BL to be sensed and amplified by the bit line sense amplifier may be selected through the I/O gating circuit 270 (in FIG. 2).

In some embodiments, the bit line sense amplifiers may apply a ground voltage to the bit lines BL1, BL2, BL3, BL4, BL5, BL6, and BL7 in response to the body refresh command outputted from the command decoder 220. As a result, the holes accumulated in the body region of the dummy memory cells DMC included in the dummy cell array regions 21*b*, 22*b*, 23*b*, and 24*b* are transferred to the bit lines BL1, BL2, BL3, BL4, BL5, BL6, and BL7.

A bit line sense amplifier region BLSA in the memory cell array 400 and the sub-word line driver region SWB may be positioned in a peripheral circuit region containing additional circuits for operating the memory device 300. For example, the peripheral circuit region may be positioned on a peri substrate underneath the sub-array blocks 21, 22, 23, and 24.

Figure 5:
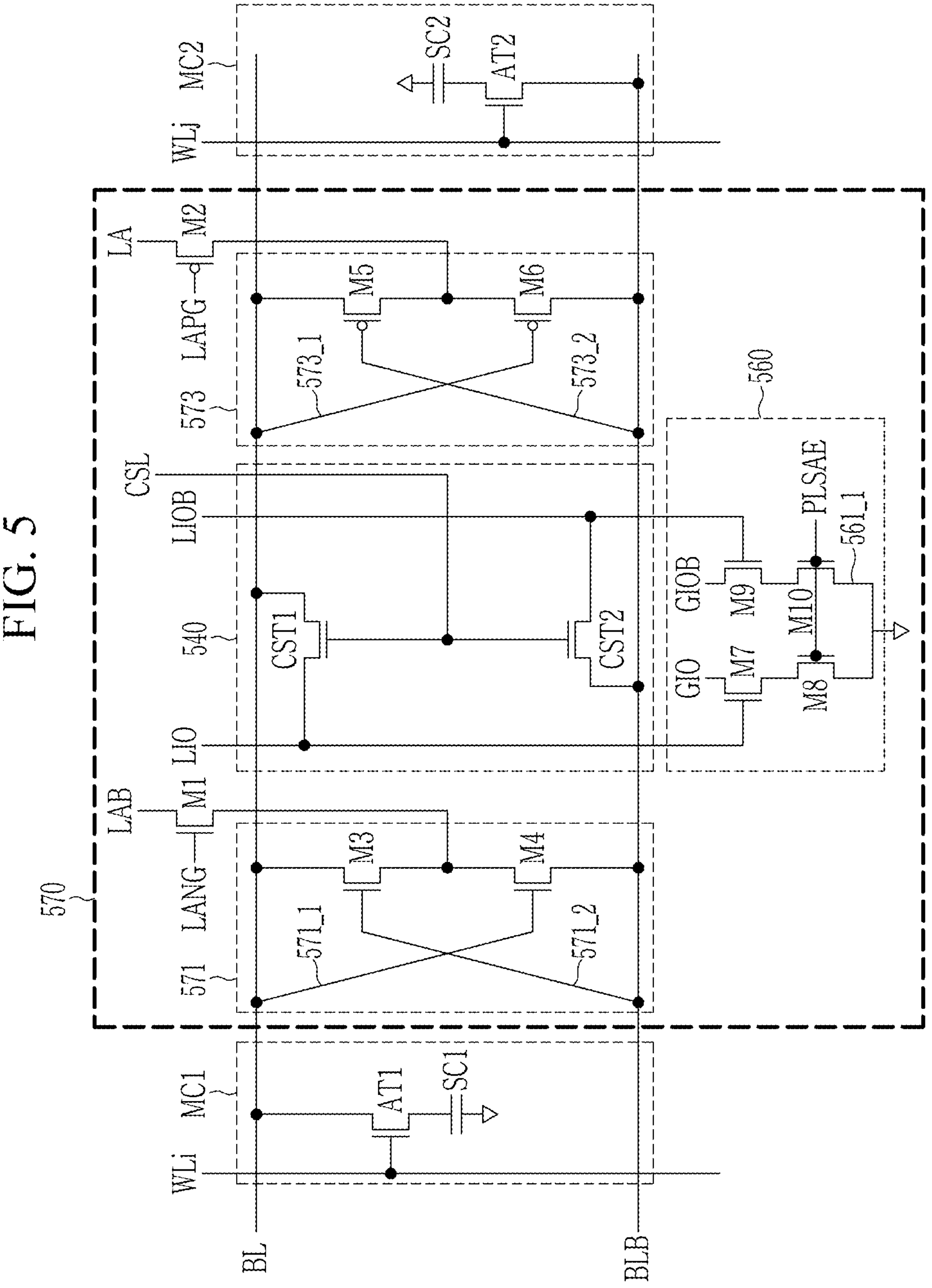
FIG. 5 illustrates a sense amplifier circuit according to an embodiment.

FIG. 5 illustrates a sense amplifier circuit according to an embodiment.

Referring to FIG. 5, a sense amplifier circuit 570 may be connected to the bit line BL and a complementary bit line BLB. A plurality of memory cells may be connected to the bit line BL, and the word lines WL may be connected to each of the memory cells. Additionally, a plurality of memory cells may be connected to the complementary bit line BLB, and the word lines WL may be connected to each of the memory cells. In some embodiments, the sense amplifier circuit 570 may be connected to one of the bit line BL and the complementary bit line BLB. For better understanding and ease of description, in FIG. 5, one memory cell MC1 connected to bit line BL, one word line WLi in the memory cell MC1, one memory cell MC2 connected to the complementary bit line BLB, and one word line WLj connected to the memory cell MC2 are shown.

In addition, in FIG. 5, the memory cell MC1 is shown as including a switching transistor AT1 and a capacitor SC1, and the memory cell MC2 is shown as including a switching transistor AT2 and a capacitor SC2, but a structure of the memory cells MC1 and MC2 is not limited thereto.

The sense amplifier circuit 570 may include an N-type sense amplifier 571, a P-type sense amplifier 573, an input/output gate circuit 540, a local sense amplifier 560, and transistors M1 and M2. In some embodiments, transistors M1 to M10, CST1, and CST2 shown in FIG. 5 may be metal oxide semiconductor (MOS) transistors. In some embodiments, the transistors M1, M3, M4, M7, M8, M9, M10, CST1, and CST2 may be n-channel transistors, such as NMOS transistors. Additionally, the transistors M2, M5, and M6 may be p-channel transistors, such as PMOS transistors. The transistors M1 to M10, CST1, and CST2 may have their source, drain, and gate configured as a first input terminal, a second input terminal, and a control terminal, respectively.

The N-type sense amplifier 571 may include the third transistor M3 and the fourth transistor M4. A gate of the third transistor M3 may be electrically connected to the complementary bit line BLB through a conductive line 571_2. A gate of the fourth transistor M4 may be electrically connected to the bit line BL through a conductive line 571_1. A source of the third transistor M3 and a source of the fourth transistor M4 may be electrically connected to the bit line BL and the complementary bit line BLB, respectively. A first voltage LAB may be inputted to a drain of the third transistor M3 and a drain of the fourth transistor M4 in response to a N-type sense amplifier driving signal LANG. The N-type sense amplifier driving signal LANG may have an active level (e.g., high level) for turning on the first transistor M1 or an inactive level (e.g., low level) for turning off the first transistor M1. The first voltage LAB may be a ground voltage.

The third transistor M3 and fourth transistor M4 may be turned on or off depending on a voltage change of the bit line BL or the complementary bit line BLB. When the third transistor M3 is turned on, the first voltage LAB may be provided to the bit line BL. When the fourth transistor M4 is turned on, the first voltage LAB may be provided to the complementary bit line BLB.

The P-type sense amplifier 573 may include the fifth transistor M5 and the sixth transistor M6. A gate of the fifth transistor M5 may be electrically connected to the complementary bit line BLB through a conductive line 573_2. A gate of the sixth transistor M6 may be electrically connected to the bit line BL through a conductive line 573_1. A source of the fifth transistor M5 and a source of the sixth transistor M6 may be electrically connected to the bit line BL and the complementary bit line BLB, respectively. A second voltage LA may be inputted to a drain of the fifth transistor M5 and a drain of the sixth transistor M6 in response to a P-type sense amplifier driving signal LAPG. The P-type sense amplifier driving signal LAPG may have an active level (e.g., low level) or an inactive level (e.g., high level) for turning off the second transistor M2. The second voltage LA may be a power voltage.

The fifth transistor M5 and sixth transistor M6 may be turned on or off depending on a voltage change of the bit line BL or the complementary bit line BLB. When the fifth transistor M5 is turned on, the second voltage LA may be provided to the bit line BL. When the sixth transistor M6 is turned on, the second voltage LA may be provided to the complementary bit line BLB.

The input/output gate 540 may include a first column selection transistor CST1 and a second column selection transistor CST2. A drain of the first column selection transistor CST1 may be electrically connected to the bit line BL, and a drain of the second column selection transistor CST2 may be electrically connected to the complementary bit line BLB. A source of the first column selection transistor CST1 may be electrically connected to a local input/output line LIO, and a source of the second column selection transistor CST2 may be electrically connected to a complementary local input/output line LIOB. A column selection line CSL may be connected to a gate of the first column selection transistor CST1 and a gate of the first column selection transistor CST2. A bit line pair BL and BLB to which the sense amplifier 570 is connected may be connected to a local input/output line pair LIO and LIOB through the column select transistors CST1 and CST2.

The column selection transistors CST1 and CST2 in the I/O gate 540 may transmit a potential output from the N-type sense amplifier 571 and the P-type sense amplifier 573 to the local sense amplifier 560 in response to a column selection signal of the column selection line CSL.

The local sense amplifier 560 may include the seventh transistor M7, the eighth transistor M8, the ninth transistor M9, and the tenth transistor M10. The seventh transistor M7, the eighth transistor M8, the ninth transistor M9, and the tenth transistor M10 may be electrically connected within the local sense amplifier 560 through a conductive line 561_1.

A local enable signal PLSAE may be inputted to a gate of the eighth transistor M8 and a gate of the tenth transistor M10. The gate of the eighth transistor M8 and the tenth transistor M10 may be turned on through the local enable signal PLSAE, to activate the local sense amplifier 560. When the local sense amplifier 560 is activated, the seventh transistor M7 and the ninth transistor M9 may respectively invert and output data of the local input/output line pair LIO and LIOB to a global input/output line pair GIO and GIOB.

The memory device 100 may operate as follows. First, when word lines Wli and WLj are activated, the switching transistor AT1 of memory cell MC1 may be turned on to move charges between the bit line BL and the capacitor SC1 in the memory cell MC1, and the switching transistor AT2 of the memory cell MC2 may be turned on to move charges between the complementary bit line BLB and the capacitor SC2 in the memory cell MC2. Thereafter, the N-type sense amplifier 571 or the P-type sense amplifier 573 amplifies a potential difference between the bit line BL and the complementary bit line BLB. Then, when a column selection signal is at an active level, the input/output gate 540 may output data of the bit line BL or the complementary bit line BLB through the local input/output line LIO or the complementary local input/output line LIOB, respectively. In other words, in response to the column selection signal, the column selection transistors CST1 and CST2 in the I/O gate 540 may transmit a potential output from the N-type sense amplifier 571 or the P-type sense amplifier 573 to the local sense amplifier 560. The local sense amplifier 560 may be activated by the local enable signal PLSAE to invert data received from the local input/output line pair LIO and LIOB and output it to the global input/output line pair GIO and GIOB.

The sense amplifier 570 may further include a precharger. The precharger may equalize the voltages of the bit line BL and the complementary bit line BLB to a precharge voltage both before and after the operation of the N-type sense amplifier 571 or P-type sense amplifier 573.

Figure 6:
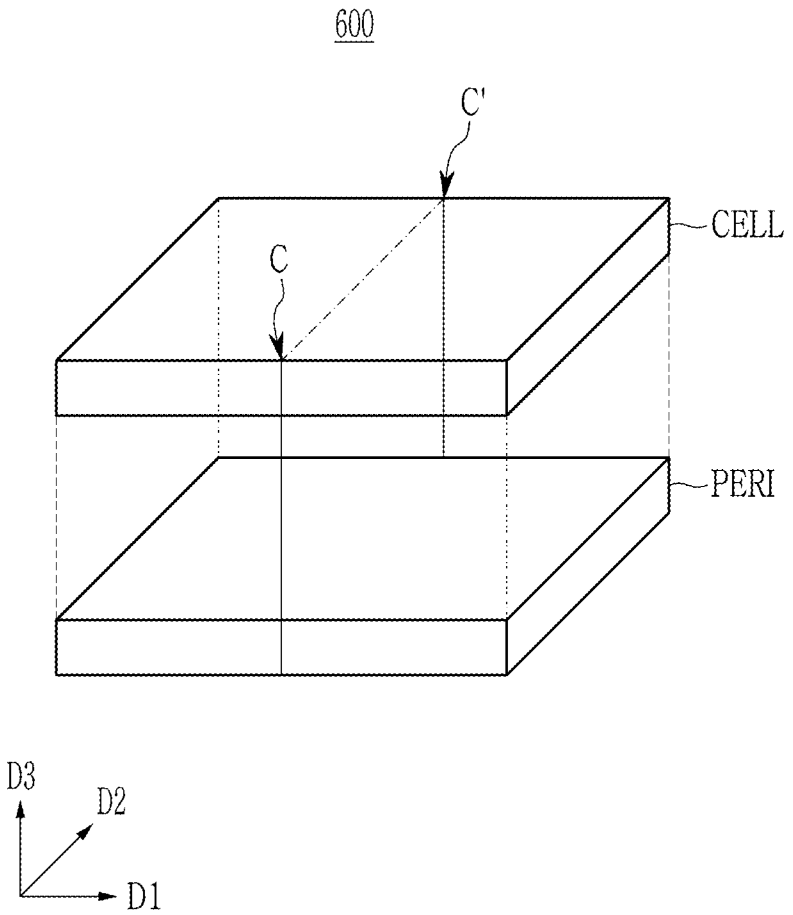
FIG. 6 illustrates a perspective view showing the memory device of FIG. 1 implemented according to an embodiment.

FIG. 6 illustrates a perspective view showing the memory device of FIG. 1 implemented according to an embodiment.

Referring to FIGS. 1 to 5, the memory device 110 in FIG. 1 may include the peripheral circuit region PERI and the memory cell area CELL. The memory cell region CELL may be three-dimensionally stacked on the peripheral circuit region PERI along a third direction D3. In other words, the memory device 110 may have a cell on peri (CoP) structure.

The memory cell region CELL may include a memory cell array 210 (in FIG. 2). The peripheral circuit region PERI may include the row decoder 250 (in FIG. 2), the refresh control circuit 290 (in FIG. 2), and the I/O gating circuit 270 (in FIG. 2).

Figure 7:
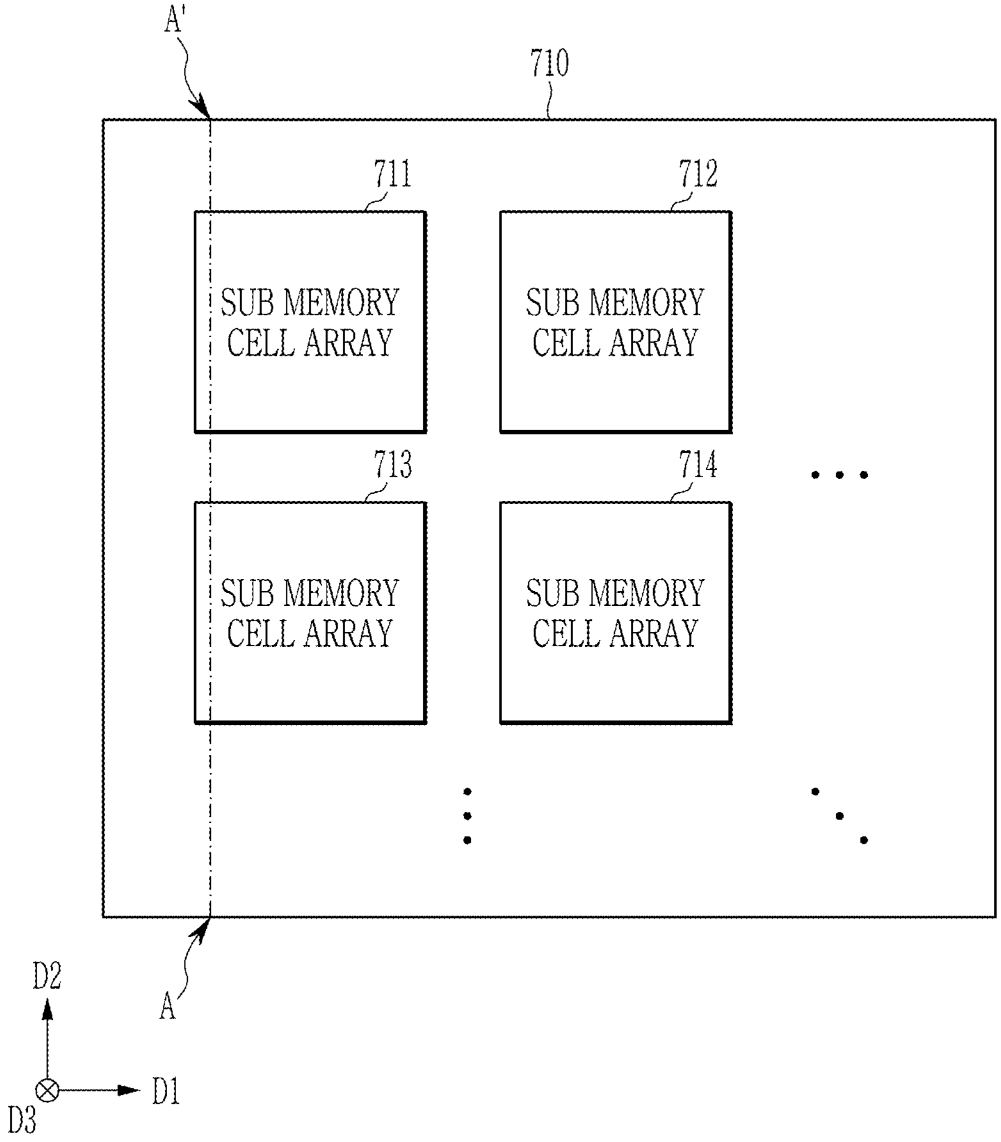
FIG. 7 illustrates a top plan view showing a plurality of sub-array blocks included in the memory cell region CELL of FIG. 6.

FIG. 7 illustrates a top plan view showing a plurality of sub-array blocks included in the memory cell region CELL of FIG. 6.

Referring to FIGS. 1 to 6, the memory cell array 210 (in FIG. 2) may include a plurality of sub-array blocks 711 to 714.

The sub-array blocks 711 to 714 may be arranged in a matrix structure along the first direction D1 and the second direction D2. The sub-array blocks 711, 712, 713, and 714 may be spaced apart from each other. However, the scope of present disclosure is not limited thereto, and the sub-array blocks 711, 712, 713, and 714 may also be positioned adjacent to each other.

The first sub-memory cell array 711 and the second sub-memory cell array 712 may share one or more bit line sense amplifiers BLSA. The bit line sense amplifier BLSA shared by the first sub-memory cell array 711 and the second sub-memory cell array 712 may be connected to the bit line BL connected to the first sub-memory cell array 711 and the complementary bit line BLB connected to the second sub-memory cell array 712. In a similar fashion, the third sub-memory cell array 713 and the fourth sub-memory cell array 714 may share one or more bit line sense amplifiers BLSA.

Figure 8:
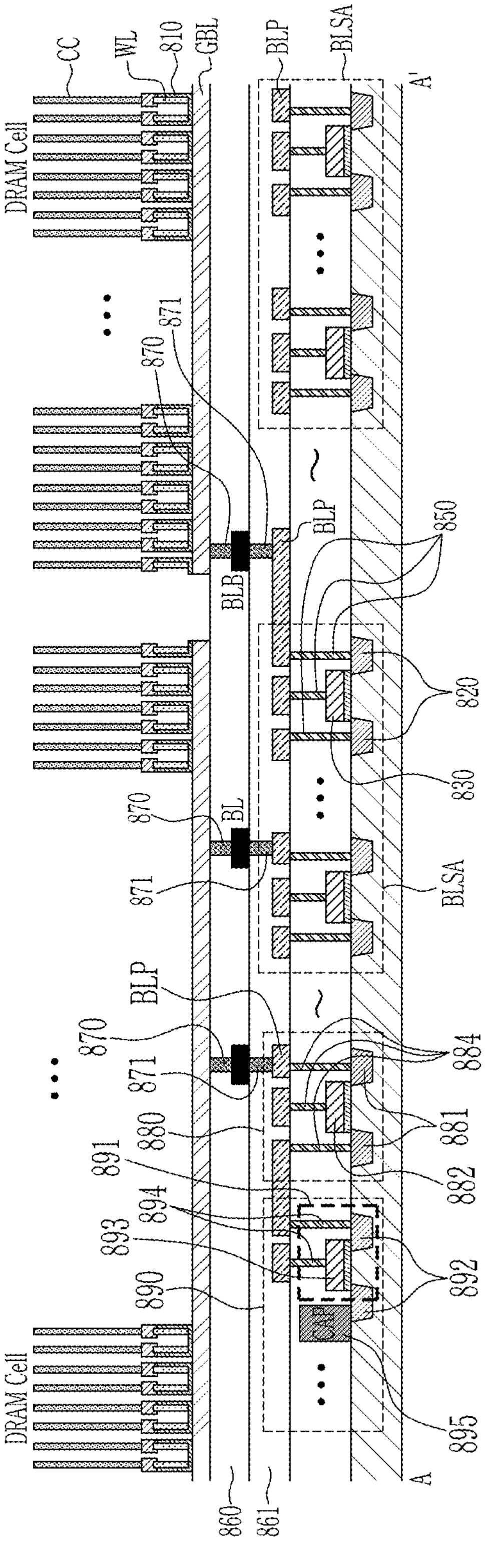
FIG. 8 illustrates a layer cross-sectional view showing a semiconductor memory device according to an embodiment.

FIG. 8 illustrates a layer cross-sectional view showing a semiconductor memory device according to an embodiment.

FIG. 8 illustrates a cross-sectional view of a semiconductor memory device with a cell-on-peri structure. In this view, the memory cell array 710 of FIG. 7 is shown along the A-A' cut. The bit line sense amplifier BLSA is positioned in the lower layer, and the memory cell array 710 is located in the upper layer.

A layer of the memory cell array 710 may include a plurality of array matrices, each of which includes a plurality of memory cells. Each of the array matrices may include a plurality of cell bit lines GBL and a plurality of word lines WL, and memory cells may be arranged in areas where the cell bit lines GBL and the word lines WL intersect.

The memory cells may be cells of volatile memory such as dynamic random access memory (DRAM), resistive memory such as phase-change RAM (PRAM), resistive RAM (RRAM), etc., nano floating gate memory (NFGM), polymer RAM (PoRAM), magnetic RAM (MRAM), or ferroelectric RAM (FeRAM), or flash memory cells. Each of the memory cells may include a cell capacitor CC and a transistor that connects or disconnects it from a cell bit line GBL. The transistor may include a channel 810 that is turned on and off according to a signal of a word line WL. The channel 810 may be oriented vertically with respect to an array matrix, connecting the cell bit line GBL below it to the cell capacitor CC above it. The channel 810 may include indium gallium zinc oxide (IGZO).

A layer of the bit line sense amplifier BLSA may be disposed below a layer of the memory cell array 710, and may include a transistor, a wiring layer BLP, and a via 850 connecting the transistor and the wiring layer BLP.

The transistor may include a source/drain 820 and a gate electrode 830, and the source/drain 820 and the gate electrode 830 may be connected to the wiring layer BLP disposed on an upper portion of the layer of the bit line sense amplifier BLSA through the via 850 disposed in an insulating layer. The transistor includes an NMOS transistor and a PMOS transistor that constitute the bit line sense amplifier BLSA, and may also include a column selection transistor of a column selector. The wiring layer BLP may include a column selection line CSL, a power voltage line LA, a ground voltage line LAB, a precharge/equalization signal line PEQ, a local input/output line LIO, a complementary local input/output line LIOB, etc. shown in FIG. 5.

The bit line sense amplifier BLSA may be connected to the bit line BL and the complementary bit line BLB through a via 871 disposed in an interlayer insulating layer 861. The bit line BL and the complementary bit line BLB may be connected to the cell bit line GBL through a via 870 positioned in the interlayer insulating layer 860 (e.g., BL contact, BLB contact). Here, the bit line BL and the complementary bit line BLB connected to a single bit line sense amplifier BLSA may also connect to cell bit lines GBL that are distributed on opposite sides of the boundary region of two neighboring array matrices.

A switch transistor 880 and a dummy cell 890 may be positioned below a layer of the memory cell array 710. The switch transistor 880 may include a source/drain 881 and a gate electrode 882. Both the source/drain 881 and the gate electrode 882 may be connected to the wiring layer BLP located above the layer of the bit line sense amplifier BLSA through the via 884 disposed in the insulating layer.

The switch transistor 880 may be connected between the bit line BL and the dummy cell 890, and may receive a switch control signal from the refresh control circuit 290 (in FIG. 2). In this case, the refresh control circuit 290 may send a switch control signal to the switch transistor 880, which closes the switch transistor 880, during the body refresh operation on the dummy cell 890.

The dummy cell 890 may include a transistor 891 and a capacitor 895. The transistor 891 may be connected to the switch transistor 880 and the wiring layer BLP located above the layer of the bit line sense amplifier BLSA. The transistor 891 may include a source/drain 892 and a gate electrode 893, and the source/drain 892 and the gate electrode 893 may be connected to the wiring layer BLP through the via 894 disposed in the insulating layer. The capacitor 895 may be connected to the source/drain 892 of the transistor 891. The capacitor 895 may store or discharge charges based on a data voltage applied from the bit line BL.

For example, when a ground voltage is applied to the bit line BL connected to the dummy cell 890, a discharge process of the capacitor 895 may be performed in which the charge stored in the capacitor 895 is transferred to the bit line BL. In addition, when a supply voltage is applied to the bit line BL connected to the dummy cell 890, the capacitor 895 may undergo a charging process where charges are transferred from the bit line BL to the capacitor 895.

In the semiconductor memory device with a cell-on-peri structure, as illustrated in FIGS. 1 to 3, the bit line sense amplifier may be positioned such that a column selector and a complementary column selector are adjacent to opposite sides of a corresponding bit line sense amplifier block. This arrangement reduces the internal wiring length of the bit line sense amplifier, decreases the number of wires per unit area required within the bitline sense amplifier, and simplifies its layout.

Figure 9:
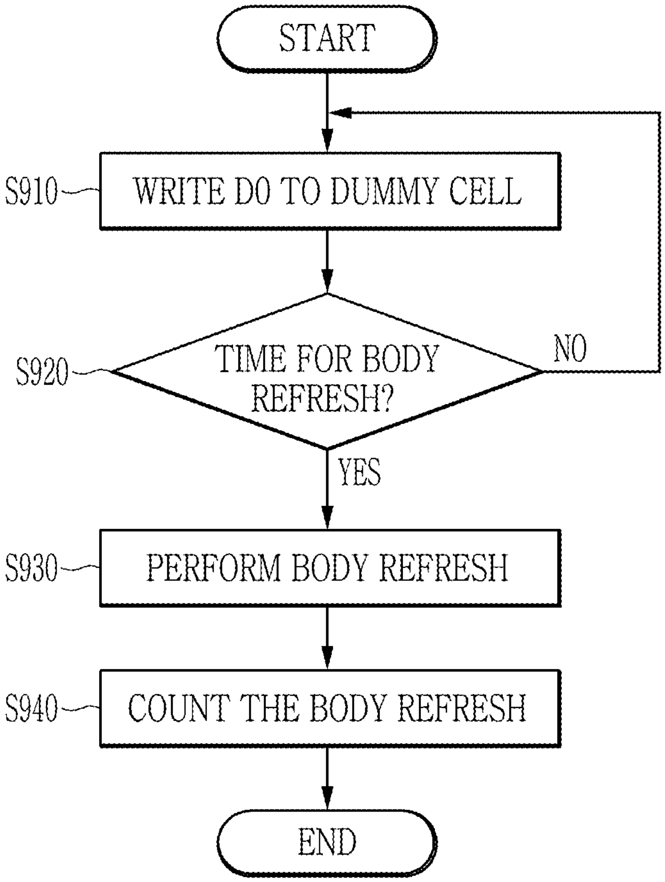
FIG. 9 illustrates a flowchart showing a process of performing a body refresh using a dummy cell.

FIG. 9 illustrates a flowchart showing a process of performing a body refresh using a dummy cell.

In an operation S910, data 0 may be written to a dummy cell. When a word line connected to the dummy cell is activated and the ground voltage VSS is applied to the bit line connected to the dummy cell, all charges stored in a capacitor of the dummy cell may flow to the bit line. Through this process, data 0 may be written to the dummy cell.

In an operation S920, the memory device 110 (in FIG. 1) may receive a refresh command, and may determine whether a body refresh performance cycle has arrived. A refresh control circuit may determine whether the body refresh performance cycle has arrived by using a ratio of body refresh and normal refresh. For example, if the ratio of body refresh and normal refresh is 1:8, and the refresh control circuit receives a refresh command after eight normal refresh commands have been issued since the last body refresh command, the refresh control circuit may conclude that the body refresh performance cycle has arrived. In this operation, the refresh control circuit is monitoring the balance between body refresh operations (targeting the stability of dummy cells or body regions) and normal refresh operations (targeting active memory cells). This ensures that body refresh operations are performed as needed to maintain memory integrity without excessively interrupting normal refresh operations for active memory cells.

In some embodiments, the ratio of body refresh and normal refresh may be determined based on the temperature data TEMP obtained from a temperature measurement sensor. The ratio of body refresh to normal refresh is higher at elevated temperatures compared to lower temperatures. This is because higher temperatures cause a greater amount of charge stored in the dummy cell's capacitor to leak to the bit line.

Figure 10:
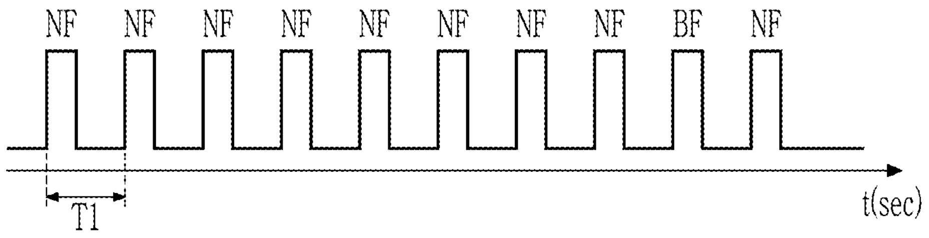
FIG. 10 illustrates a cycle of a body refresh based on temperature data having a first temperature range.

FIG. 10 illustrates a cycle of a body refresh based on temperature data having a first temperature range.

Referring to FIG. 10, the refresh control circuit 290 (in FIG. 2) may perform eight normal refresh (NF) operations and one body refresh (BF) operation when the temperature data TEMP falls within a first temperature range (e.g., room temperature, 20° C. to 25° C., or low temperature, 20° C. or less). In this case, the ratio of body refresh to normal refresh is 1:8, meaning that a body refresh is performed after eight normal refresh cycles T1.

Figure 11:
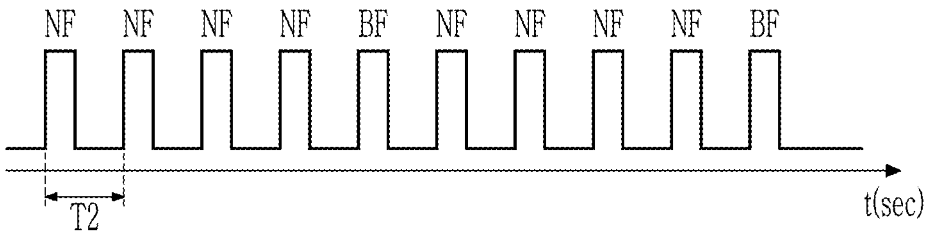
FIG. 11 illustrates a cycle of a body refresh based on temperature data having a second temperature range.

FIG. 11 illustrates a cycle of a body refresh based on temperature data having a second temperature range.

Referring to FIG. 11, the refresh control circuit may perform four normal refresh operations followed by one body refresh operation when the temperature data TEMP falls within a second temperature range (e.g., high temperature, 25° C. or higher). In this case, the ratio of body refresh to normal refresh is 1:4, meaning that a body refresh is performed after four normal refresh cycles T2. Compared to the normal refresh cycle T2 of FIG. 10, the normal refresh cycle T1 of FIG. 11 may be shorter. This is due to the increased likelihood of cell deterioration at high temperatures.

In other words, when the temperature of the memory device 110 (in FIG. 1) is higher, the refresh control circuit 290 may issue body refresh commands more frequently to mitigate potential cell deterioration.

In an operation S930, a body refresh process may be performed on a dummy cell whose body refresh cycle has arrived. The body refresh control circuit 320 (in FIG. 3) may output a target row address in response to a body refresh command based on the body refresh block information 323 (in FIG. 3). During the body refresh operation, the word line connected to the dummy cell is activated, and the voltage level of the bit line connected to each dummy cell is reduced to the ground voltage VSS. This allows holes accumulated in the body region of the transistor to transfer to the bit line at the ground voltage VSS. Accordingly, the amount of charges stored in the capacitor that leaks through the body to the bit line is reduced.

In an operation S940, the address of the dummy cell that underwent the body refresh may be stored in the register 322 (in FIG. 3). The register 322 may store a number of body refreshes for each of the memory cells included in the dummy cell. In other words, the register 322 may keep track of the number of body refreshes performed for each memory cell within the dummy cell. Based on this information, the body refresh determiner 321 (in FIG. 3) can decide whether to perform another body refresh operation of the dummy cell.

Figure 12:
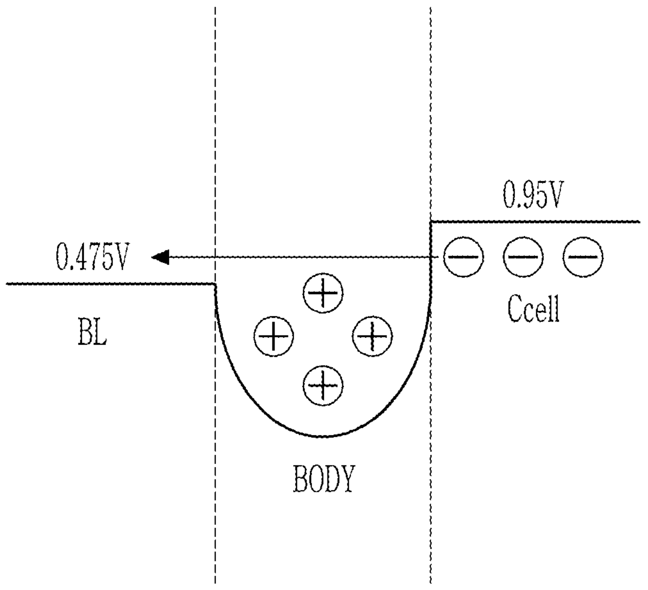
FIG. 12 illustrates a process in which a charge leaks from a memory cell to a bit line before a body refresh is performed.
Figure 13:
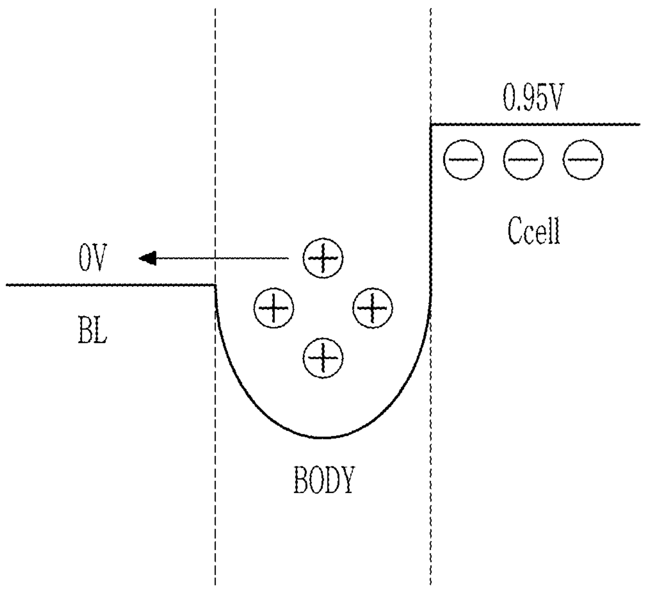
FIG. 13 illustrates a process in which a hole is transferred from a body region to a bit line after a body refresh is performed.

FIG. 12 illustrates a process in which charges leak from a memory cell to a bit line before a body refresh is performed, and FIG. 13 illustrates a process in which a hole is transferred from a body region to the bit line after a body refresh is performed.

Referring to FIG. 12, a precharge voltage level of the bit line BL is 0.475 V and a data voltage of a memory cell Ccell is 0.95 V. Since the data voltage of the memory cell Ccell is approximately twice the precharge voltage level of the bit line BL, it is difficult for charges to leak from the memory cell Ccell to the bit line BL.

However, as the number of holes in the body region BODY increases, the energy level of the body region BODY, which connects the memory cell Ccell and the bit line, BL may also rise, potentially causing charges to leak from the memory cell Ccell to the bit line BL.

Referring to FIG. 13, when the ground voltage VSS is applied as the precharge voltage level to the bit line BL, the holes in the body region BODY may be transferred to the bit line BL. As a result, the number of holes in the body region BODY decreases, leading to a reduction in its energy level. This prevents charges from leaking from the memory cell Ccell to the bit line BL.

Figure 14:
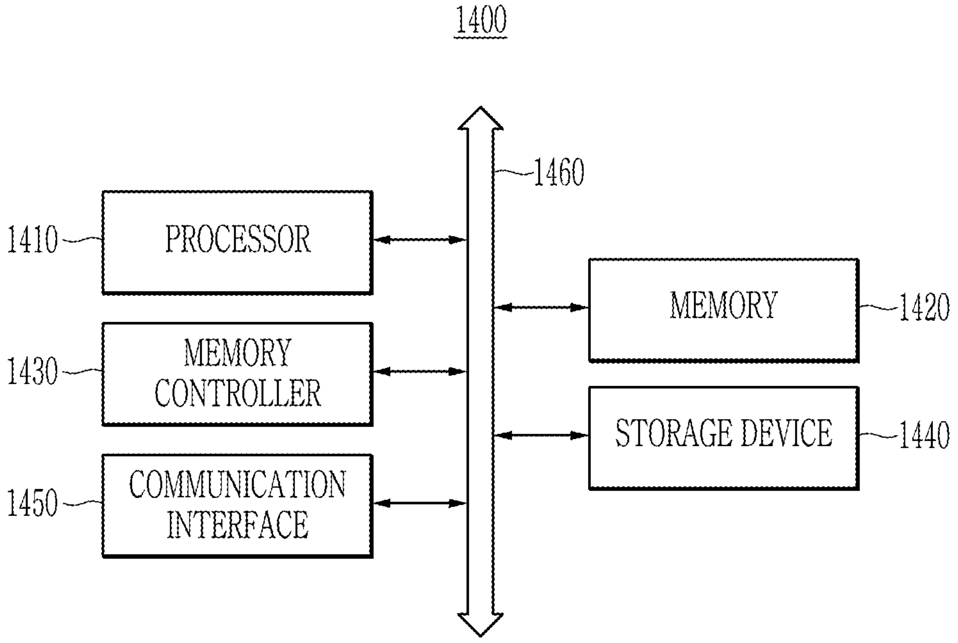
FIG. 14 illustrates a block diagram showing a computer device according to an embodiment.

FIG. 14 illustrates an example block diagram showing a computer device according to an embodiment.

Referring to FIG. 14, a computing device 1400 includes a processor 1410, a memory 1420, a memory controller 1430, a storage device 1440, a communication interface 1450, and a bus 1460. The computing device 1400 may further include other general-purpose components.

The processor 1410 controls an overall operation of each component of the computing device 1400. The processor 1410 may be implemented as at least one of various processing units such as a central processing unit (CPU), an application processor (AP), and a graphics processing unit (GPU).

The memory 1420 stores various data and commands. The memory 1420 may be implemented as a memory device described with reference to the embodiments set forth herein. The memory controller 1430 controls the transfer of data or commands to and from the memory 1420. In some embodiments, the memory controller 1430 may be provided as a separate chip from the processor 1410. In some embodiments, the memory controller 1430 may be provided as an internal component of the processor 1410.

The storage device 1440 non-temporarily stores programs and data. In some embodiments, the storage device 1440 may be implemented as a non-volatile memory. The communication interface 1450 supports wired and wireless Internet communication of the computing device 1400. In addition, the communication interface 1450 may support various communication methods other than Internet communication. The bus 1460 provides communication functionality between components of computing device 1400. The bus 1460 may include at least one type of bus depending on communication protocol between components.

Although the present disclosure has been described with reference to practical embodiments, it is not limited to these embodiments. Instead, it encompasses various modifications and equivalent arrangements within the spirit and scope of the appended claims.

What is claimed is:

1. A memory device comprising:

a memory cell array including a plurality of sub-array blocks, wherein the plurality of sub-array blocks include a plurality of word lines and a plurality of bit lines;

a command decoder configured to decode a command received from a memory controller and generate a refresh command to control a refresh operation; and a refresh control circuit configured to receive the refresh command from the command decoder, determine a target row address corresponding to a sub-array block based on a number of body refreshes performed on the sub-array blocks, and output the target row address.

2. The memory device of claim 1, wherein the refresh control circuit includes:

a refresh command determination circuit configured to receive the refresh command and output a normal refresh command or a body refresh command;

a normal refresh control circuit configured to calculate a row address for a normal refresh operation and output the row address in response to the normal refresh command;

a body refresh control circuit configured to determine and output the target row address in response to the body refresh command; and a refresh row address selector configured to output the row address or the target row address.

3. The memory device of claim 2, wherein the refresh command determination circuit is configured to receive temperature data of the memory device and output the normal refresh command or the body refresh command based on the temperature data.

4. The memory device of claim 3, wherein the refresh command determination circuit is configured to output the body refresh command and the normal refresh command at a ratio of 1:a when the temperature data is within a first temperature range, and output the body refresh command and the normal refresh command at a ratio of 1:b when the temperature data is within a second temperature range that is higher than the first temperature range, wherein a is a positive integer and b is a positive integer and b>a.

5. The memory device of claim 3, wherein the body refresh control circuit includes:

a register configured to store body refresh block information, wherein the body refresh block information includes body refresh counts for the sub-array blocks and a plurality of row addresses corresponding to the sub-array blocks; and a body refresh determiner configured to obtain the body refresh counts for the sub-array blocks based on the body refresh block information, determine one target sub-array block among the sub-array blocks based on the body refresh counts, and output a row address corresponding to the target sub-array block as the target row address.

6. The memory device of claim 5, wherein the body refresh determiner is configured to determine a sub-array block with the smallest body refresh count as the target sub-array block.

7. The memory device of claim 2, further comprising:

a plurality of bit line sense amplifiers connected to a plurality of bit lines and configured to apply a ground voltage to the bit lines in response to the body refresh command.

8. The memory device of claim 1, wherein the sub-array blocks include a plurality of memory cells and a plurality of dummy memory cells, and the dummy memory cells are connected to a first or last word line of the word lines.

9. The memory device of claim 8, wherein the memory cells are positioned in a memory cell region, and the dummy memory cells are positioned in a peripheral circuit region stacked with the memory cell region.

10. A memory device comprising:

a memory cell region including a plurality of memory cells connected to a plurality of word lines and a plurality of bit lines; and a peripheral circuit region stacked with respect to the memory cell region, the peripheral circuit region including a plurality of bit line sense amplifiers configured to detect and amplify signal differences between the bit lines, a plurality of dummy memory cells, and a plurality of switching transistors configured to connect the bit lines to the dummy memory cells.

11. The memory device of claim 10, wherein the dummy memory cells are connected to corresponding word lines among the word lines, and when the word lines are activated, the switching transistors are turned on.

12. The memory device of claim 11, wherein the bit line sense amplifiers apply a ground voltage to the bit lines when the word lines are activated.

13. The memory device of claim 12, wherein a plurality of interlayer insulating layers and the bit lines are positioned between the memory cell region and the peripheral circuit region.

14. A refresh method for a memory device, comprising:

receiving a refresh command to control the execution of a refresh operation;

outputting a normal refresh command or a body refresh command based on the refresh command;

outputting a row address to perform a normal refresh operation in response to the normal refresh command, and determining a target row address for a sub-array block among a plurality of sub-array blocks to perform a body refresh operation in response to the body refresh command; and outputting the target row address or the row address.

15. The refresh method of claim 14, wherein the outputting of the normal refresh command or the body refresh command based on the refresh command includes outputting a normal refresh command or a body refresh command based on temperature data of the memory device.

16. The refresh method of claim 15, wherein the outputting of the normal refresh command or the body refresh command based on the temperature data includes outputting the body refresh command and the normal refresh command at a ratio of 1:a when the temperature data is within a first temperature range, wherein a is a positive integer.

17. The refresh method of claim 16, wherein the outputting of the normal refresh command or the body refresh command based on the temperature data includes outputting the body refresh command and the normal refresh command at a ratio of 1:b when the temperature data is within a second temperature range that is higher than the first temperature range, wherein b is a positive integer and b>a.

18. The refresh method of claim 14, wherein the determining of the target row address includes:

determining a target sub-array block based on body refresh block information, which includes body refresh counts for the sub-array blocks and a plurality of row addresses corresponding to the sub-array blocks; and determining a row address corresponding to the target sub-array block from the row addresses as the target row address.

19. The refresh method of claim 18, wherein the determining of the target sub-array block includes determining a sub-array block with the smallest body refresh count as the target sub-array block.

20. The refresh method of claim 14, further comprising:

applying a ground voltage to a plurality of bit lines connected to the target row.

* * * * *